United States Patent Office 3,360,472
Patented Dec. 26, 1967

3,360,472
PAINT REMOVER COMPOSITION
Adolph Renold, Somerset, N.J., assignor to Colgate-Palmolive Company, New York, N.Y., a corporation of Delaware
No Drawing. Filed Oct. 3, 1963, Ser. No. 313,429
1 Claim. (Cl. 252—170)

This invention is concerned with compositions for deodorizing air and with a process for preparing the same. More specifically, the invention is directed to stable, effective space deodorants which are characterized by little or no odor themselves, and to a process by which such compositions can be prepared.

As is well known in the art, numerous compositions have been proposed, and some have been used, for countering foul air. For at least half a century, "ozonides" have been known to have deodorizing utility; however, their use has been limited by certain disadvantageous features. They have a tendency to explode under some circumstances, and are unstable in the presence of water. Thus, in the past, efforts have been made to avoid the presence of water in preparing such reaction products. While alcohols have been used considerably as an ozonolysis medium, the reaction products so prepared have frequently suffered from instability. Also when they have been prepared in media other than an alcohol, and have then been mixed with an alcohol to form a deodorant, instability continues. Apparently such reaction products are unstable in the presence of hydroxyl groups as well as very unstable in the presence of water. There has been a need for a long period of years, therefore, for useful, stable ozonized olefinic materials. The present invention is directed to satisfying this need.

It is an object of this invention, therefore, to provide stable reaction products of ozone and olefinic materials. It is a further object of the invention to provide such compositions suitable for use as air deodorants. Another object of the invention is to provide stable, effective space deodorants which themselves have little or no odor. Another object of the invention is to provide a process for preparing such stable compositions. Other objects of the invention will be apparent from the following description.

The air-deodorizing compositions of this invention comprise a reaction product of ozone and an olefinic material having from about eight to about twenty carbon atoms per molecule and a liquid, normally gaseous, low molecular weight halogenated hydrocarbon. The process of this invention involves reacting ozone with an unsaturated organic liquid or low melting solid in the presence of such a halogenated hydrocarbon.

As mentioned above, the olefinic materials used herein contain from about eight to about twenty carbon atoms per molecule. Included among such olefins are monocyclic terpenes such as limonene, dipentene, sylvestrene, ter pinene, terpinolene, etc.; dicyclic terpenes such as pinene, camphene, fenchene, etc.; sesquiterpinenes, such as farnesol, bisabolene, cadinene, etc. Other unsaturated compounds include geraniol, geranial (citral), citronellol, rhodinol which is a mixture of citronellol and geraniol obtained from Reunion geranium oil; etc. Others include olive oil, oleic acid, linoleic acid, ethyl ester of linoleic acid, dicyclopentadiene, methyl dicyclopentadiene, etc.

A liquid, normally gaseous, low molecular weight halogenated hydrocarbon is used together with one or more of the foregoing ozonized compositions of this invention. In general, the halogenated hydrocarbon should be substantially non-toxic, non-inflammable, odorless, etc. Suitable materials include liquefied, normally gaseous, low molecular weight halogenated and fluorinated hydrocarbon materials including monochlorodifluoromethane, monochlorodifluoroethane, dichloromonofluoroethane, dichlorodifluoromethane, dichlorotetrafluoroethane, trichloromonofluoromethane, difluoroethane, etc. Other halogenated hydrocarbon materials include halogenated methane, ethane, propane, butane, pentane, and mixtures thereof. Particularly preferred herein, however, are trichloromonofluoromethane and dichlorodifluoromethane. In some instances it is desirable to use a combination of two or more of the low boiling materials to serve as a carrier and propellant for the ozonized material, in order to achieve a suitable pressure within the container in which they are used and to impart such desired properties as stability, ease of delivery, etc. to a deodorant composition.

The halogenated hydrocarbon materials can be used as such, or in mixtures as mentioned above, and also can be suitably stabilized with other materials. For example, a chlorofluoroalkane can be stabilized with a low molecular weight nitro alkane such as nitromethane.

In addition to the foregoing components of the present invention, various adjuvants can be utilized therewith. Ingredients which impart further desired qualities to the deodorants, e.g. camphor, menthol, pine oil, synthetic musks, clove, rose, and peppermint oils, benzoin, lauryl methacrylate, trimethyl hexanal, etc., can be incorporated in the present compositions in minor proportions.

The novel deodorant compositions disclosed herein are adapted for use in conventional aerosol dispensers now in commercial use. Inasmuch as the dispensers and valve parts are made from a wide variety of materials, e.g., aluminum, tinplate, steel, bronze, copper, brass, cadmium, nickel, etc., certain chemical reactions may occur between the said materials and the contained compositions. As a result undersirable changes may occur in the compositions. Furthermore, possible malfunctioning of the valve parts, perforation of the container, etc., may result. In order to avoid such undesirable results, corrosion inhibitors such as phosphates, chromates, nitrates, benzoates, etc., may be incorporated in the compositions before final sealing of the container. In some cases it may be desirable to coat the inside of the container and other parts thereof with which the deodorants may come in contact with a suitable lacquer or other corrosion resistant coating.

As mentioned above, the novel process of this invention involves reaction of ozone with an unsaturated compound in the presence of a low boiling halogenated hydrocarbon. Reaction is conducted with conventional ozonolysis equipment, typical of which is a Welsbach Model T23 laboratory ozonizer. Reaction temperature can be varied from about $-10°$ C. to about $-50°$ C., and is preferably maintained at about $-40°$ C.

Because of its availability and advantageous dilution effect, dry oxygen-ozone mixtures comprising 0.5 to 5% ozone and the balance oxygen, are particularly suitable. It is recommended that the ozone reactant be bubbled into a solution of an unsaturated compound and a halogenated hydrocarbon, particularly a fluorinated material, at a rate sufficient for rapid reaction but insufficient to flow through the solution appreciably unreacted and carrying away with it some of the solution. With the above ozonizer a flow rate of from about 0.5 to about 1 liter per minute is advantageous at the temperatures already specified. It is to be understood, however, that ozone and other ozone gas mixtures can be used in addition to the ozone-oxygen gas mixtures mentioned above.

Voltage maintained in the ozonizer used, can be varied between about 60 and about 110 volts. Pressure can range from about 4 to about 8 pounds per square inch (gauge).

It is emphasized that water, alcohol or a solvent supplying hydroxyl groups should be kept from the reaction system, in order to avoid decomposition of the active ingredient, that is, the ozonized olefin reaction product.

In order to indicate more fully the nature of the present invention, the following illustrative examples are provided. It is to be understood, however, that such examples serve as illustrations only and are not intended to limit the scope of the invention. Unless otherwise indicated, all parts are by weight. Examples 1 and 2 serve to illustrate new compositions. Examples 3 and 4 serve to illustrate the new process, and Example 5 is included to illustrate a related process in which ethanol is used as an ozonolysis medium.

*Example 1*

An aerosol composition—Product 1—was formed of:

| | Parts |
|---|---|
| Completely ozonized limonene | 0.5 |
| Trichlorofluoromethane | 49.5 |
| Dichlorodifluoromethane | 50.0 |

Odor chambers used for test purposes of this composition and another composition were approximately 500 cubic feet capacity. The chambers were closed, identical, adjacent rooms equipped with identical exhaust fans. In each room, the same amount of cauliflower was boiled with the same amount of water for the same time interval. Product 1 was sprayed in one room, and an aerosol composition containing 2 percent by weight of lauryl methacrylate and the same ratio of propellants as Product 1 was sprayed into the other room. A panel of six people who are trained in making odor comparisons, visited the rooms and noted the changes in odor. It was found that 6.6 grams of Product 1, containing 0.5 percent of completely ozonized limonene, reduced the cauliflower odor as efficiently as 6.8 grams of the air deodorant containing 2 percent of the methacrylate. In addition, Product 1 did not impart an odor to the test chamber.

*Example 2*

A series of experiments were made with completely ozonized limonene in trichloromonofluoromethane (CFM) containing 3 percent by weight of nitromethane, and the ethanol, to determine stability of the resulting compositions. In the strictly comparable study, the same quantity of ozonized limonene was used, namely 3 percent by weight in each composition. Percent active oxygen was determined at the start of the study, and periodically during storage of the composition at about 55° C. Results of the study are set forth below in Table I.

TABLE I

| Storage, Weeks | Percent Active Oxygen | |
|---|---|---|
| | Ethanol | CFM |
| None | 100 | 100 |
| 1 | 98 | 100 |
| 2 | 91 | 96 |
| 3 | 86 | 94 |
| 4 | 80 | 92 |
| 5 | 60 | 91 |

As shown in Table I, a composition of this invention is substantially more stable than a related composition in which ethanol is present as a vehicle or carrier for ozonized olefin.

*Example 3*

A solution was formed of 4 grams of 1-p-menthene and 16 grams of trichlorofluoromethane. An oxygen-ozone gas mixture was produced in the Welsbach Ozonizer identified above, and was bubbled through the solution (cooled by a Dry Ice-acetone bath) at a rate of about one liter per minute. Conditions maintained were:

| | | |
|---|---|---|
| Voltage | volts | 90–95 |
| Pressure (in Welsbach) | p.s.i.g | 7 |
| Temperature | ° C | −40 |
| Time of ozonolysis | seconds | 1300 |
| Total ozone produced | grams | 1.61 |

Care was taken to keep moisture from the reactants and the reaction equipment by using specially dried equipment and carefully dried oxygen. The reaction product is a clear, stable, slightly viscous solution containing approximtaely 7.5 percent by weight of combined ozone.

*Example 4*

A solution was formed of 16.8 grams of limonene, 27.7 grams of p-menthane hydroperoxide and 68 grams of trichlorofluoromethane. An oxygen-ozone gas mixture was produced in the Welsbach Ozonizer mentioned above, and was bubbled through the solution at a rate of about one liter per minute. Conditions maintained were:

| | | |
|---|---|---|
| Voltage | volts | 95–105 |
| Pressure (in Welsbach) | p.s.i.g | 7–8 |
| Temperature | ° C | −30 to −40 |
| Time of ozonolysis | hours | 2 |
| Total ozone produced | grams | 9 |

Care was taken to keep moisture from the reactants as described in Example 3. The reaction product is a clear, somewhat viscous solution. Upon analysis, it was found to contain approximately 7.4 percent by weight of combined ozone.

*Example 5*

A solution was formed of 12 grams of limonene and 60 grams of absolute (dry) ethanol. An oxygen-ozone gas mixture was produced in the Welsbach Ozonizer identified above, and was bubbled through the solution (cooled as in Example 3) at a rate of about one liter per minute. Reaction conditions were:

| | | |
|---|---|---|
| Voltage | volts | 95–100 |
| Pressure (in Welsbach) | pounds | 7 |
| Time of ozonolysis | seconds | 2060 |
| Total ozone produced | grams | 4.95 |

Again, the same care was taken to avoid moisture as described in Example 3. The reaction product is a clear solution containing about 6.4 percent by weight of combined ozone. It was used for the experiments described in Table I (Example 2, above), wherein it was shown to be considerably less stable than a corresponding product formed in trichlorofluoromethane.

As demonstrated above, the compositions of this invention are stable, effective space deodorizers characterized by little or no odor themselves. They can be used to deodorize air in confined spaces such as dwelling quarters, kitchens, hospital areas, vehicles such as aircraft and trains, theatres, stores, barns and stables, etc. The deodorizing compositions contain from about 0.05 to about 10, and preferably from about 0.1 to about 2, percent by weight of the reaction products described herein. In addition to such utility, it has also been found that the reaction products can be used as a bleach, such as for cotton stained with grape juice. Such a stain is generally difficult to remove; however, it is readily removed with compositions described herein. By way of illustration, a solution of ozonized limonene is about three times more effective as a bleach than is a leading commercial sodium hypochlorite product. Furthermore, the reaction products can be used to remove coatings such as paints, varnishes, lacquers, etc. For example, one volume of a reaction product can be mixed with about nine volumes of limonene, and the mixture can be used as a paint remover or furniture polish. It will be understood that vehicles other than limonene are suitable, e.g., di- and tri-ethanolamines and other solvent-soluble alkalis, mineral spirits, etc.

The present invention has been described with reference to illustrative compositions and processes; however, it will be appreciated by those skilled in the art that other variations and modifications of this invention can be employed, without departing from the principle thereof. Thus it will be understood that the invention is not limited to the particular illustrations. It is intended in the appended claim to cover all such variations and modifications.

I claim:

A stable composition of matter consisting essentially of 1 part by volume of a reaction product of ozone and limonene and 9 parts by volume of limonene.

References Cited

UNITED STATES PATENTS

| | | | |
|---|---|---|---|
| 1,098,356 | 5/1914 | Ramage | 260—339 |
| 1,910,564 | 5/1933 | Rankin | 260—339 |
| 2,544,093 | 3/1951 | Kilgore | 252—1 |
| 2,671,812 | 3/1954 | Sparks et al. | 260—339 |
| 2,705,207 | 3/1955 | Stevens | 134—26 |
| 2,715,611 | 8/1955 | Weeks | 252—1 |
| 2,736,710 | 2/1956 | Nack | 252—170 |
| 2,752,375 | 6/1956 | Acker | 260—339 |
| 2,963,487 | 12/1960 | Perry | 260—339 |
| 3,115,471 | 12/1963 | Matuska | 252—170 |

FOREIGN PATENTS

| | | |
|---|---|---|
| 8,617 | 1905 | Great Britain. |
| 14,114 | 1900 | Great Britain. |
| 532,104 | 1/1941 | Great Britain. |
| 787,748 | 12/1957 | Great Britain. |

LEON D. ROSDOL, *Primary Examiner.*

JULIUS GREENWALD, ALBERT T. MEYERS, SAMUEL H. BLECH, *Examiners.*

H. B. GUYNN, *Asssistant Examiner.*